UNITED STATES PATENT OFFICE.

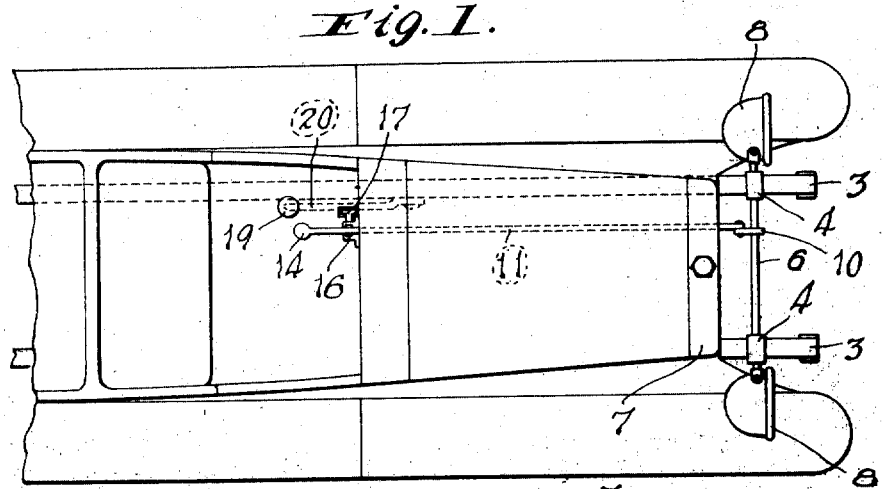
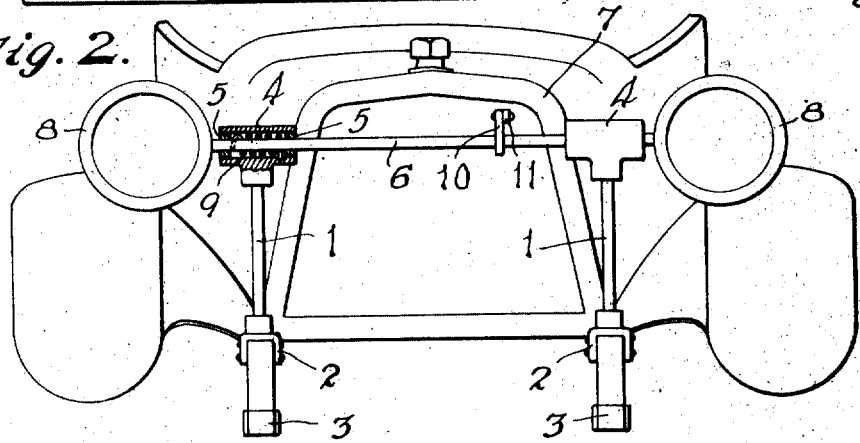
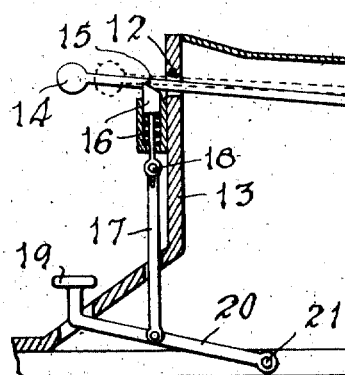

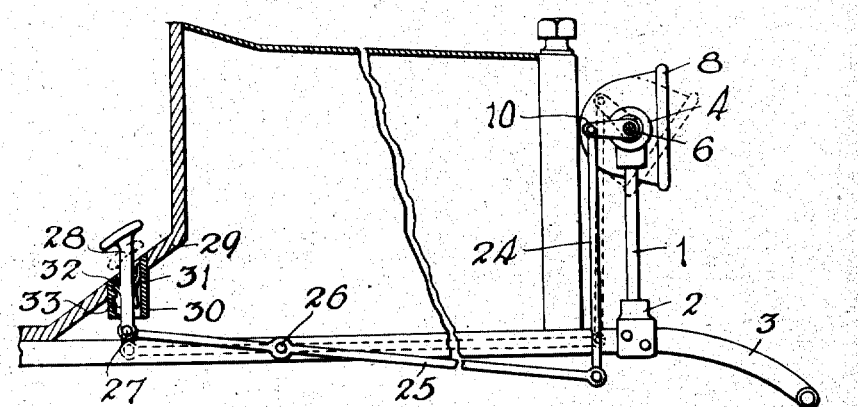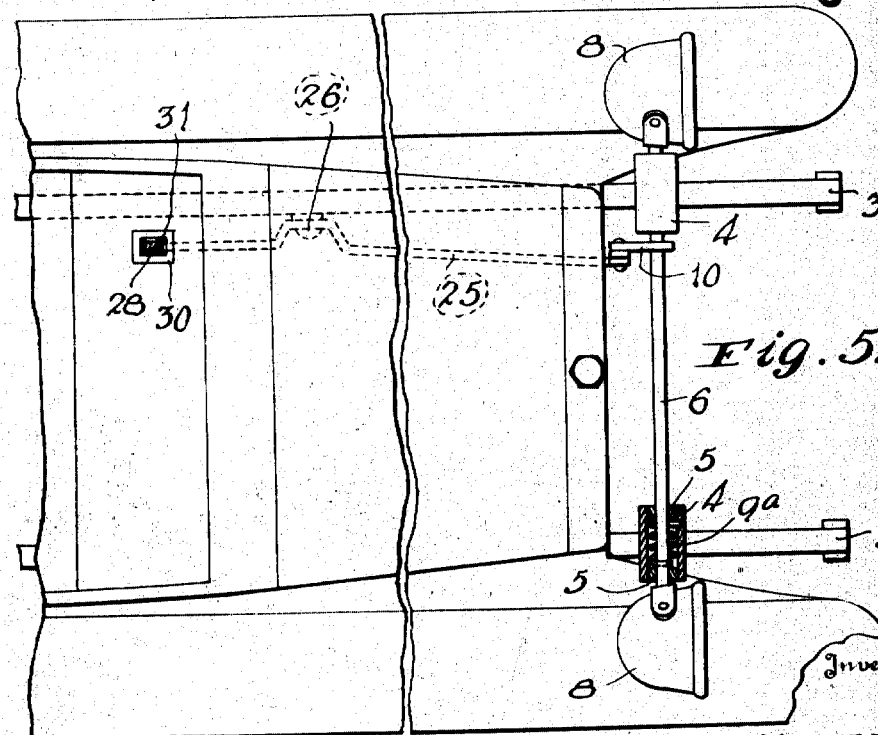

FREDRICH EMIL MEYER, OF HIXTON, WISCONSIN.

AUTOMOBILE-HEADLIGHT.

1,278,974.

Specification of Letters Patent.  Patented Sept. 17, 1918.

Application filed October 30, 1917. Serial No. 199,244.

*To all whom it may concern:*

Be it known that I, FREDRICH EMIL MEYER, a citizen of the United States, residing at Hixton, in the county of Jackson, State of Wisconsin, have invented a new and useful Automobile-Headlight; and I do hereby declare the following to be a full, clear, and exact description of the invention, such as will enable others skilled in the art to which it appertains to make and use the same.

The present invention relates to tilting headlights for motor vehicles, and has for its object to provide a device of this character which embodies novel features of construction whereby the headlights can be easily and quickly tilted downwardly when it becomes necessary to pass another vehicle, thereby causing the light to be thrown down upon the road in such a manner that the driver can see to operate the machine, although the driver of the approaching machine will not be blinded by the glare of the headlights.

Further objects of the invention are to provide a tilting headlight construction which can be manufactured at comparatively small cost and applied to any standard make of automobile, which can be quickly manipulated to tilt the headlights without the necessity of removing the hands from the steering wheel, which enables the headlights to be used with maximum efficiency when there are no other vehicles upon the road, and which is not liable to break or get out of repair.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a fragmentary top plan view of an automobile having a tilting headlight constructed in accordance with the invention applied thereto.

Fig. 2 is a front elevation of the body of the automobile, portions of the headlight mechanism being broken away and shown in section.

Fig. 3 is a vertical longitudinal sectional view through the front portion of the automobile and headlight mechanism.

Fig. 4 is a fragmentary view of the forward end of an automobile having tilting headlights mounted thereon, said view illustrating a modification of the invention, and portions being broken away and shown in section to illustrate more clearly the details of construction.

Fig. 5 is a top plan view of the forward end of an automobile having the modified construction of tilting headlights mounted thereon, portions being broken away and shown in section.

Corresponding and like parts are referred to in the following description and indicated in all the views of the drawings by the same reference characters.

Referring to the drawings, which illustrate one embodiment of the invention, the numerals 1 designate a pair of standards which are rigidly mounted upon opposite sides of the front of the vehicle. The lower ends of the standards are provided with clamps 2 which are suitably constructed for engagement with the forwardly projecting ends 3 of the side bars of the main frame of the vehicle, while the upper ends of the standards are provided with horizontally disposed sleeves 4. Bearing plates 5 are fitted in opposite ends of the sleeves and a horizontal shaft 6 which extends across the front of the radiator 7 is journaled within these bearing plates. The headlights 8 are rigidly secured to opposite ends of the horizontal shaft 6, and with this construction it will be obvious that by rocking the shaft the headlights can be tilted and positioned to direct the light straight ahead or downwardly upon the road so that an approaching motorist will not be blinded by the glare. Coil springs 9 are arranged within the sleeves 4, one end of each of the springs being connected to the horizontal shaft, while the opposite end thereof is connected to one of the bearing plates 5, said springs being under tension when the headlights are vertically disposed, and being arranged to rock the shaft and tilt the headlights to direct the light downwardly upon the road as soon as the rock shaft is released. A crank arm 10 which projects from the horizontal rock shaft is connected to an operating rod 11 which extends rearwardly through the radiator and engine hood and passes through an opening 12 in the dashboard 13. A suitable finger-piece 14 at the rear end of the operating rod provides a convenient means for pulling upon the same to return the headlights to a vertical position after they have been tilted. When the headlights are vertically disposed a notch 15 in the operating rod 11 is engaged by a spring latch 16 which serves to lock the headlights in operative position against the action of the coil springs 9. A vertically disposed slide 17 has a pin and slot connection 18 with the spring latch 16, the lower end of the slide having an operative connection with a foot plunger 19 which extends through the floor of the vehicle and is positioned in such a manner that it can be conveniently operated by the driver, thereby enabling the spring latch 16 to be quickly disengaged from the operating rod 11 without the necessity of removing the hands from the steering wheel. In the present instance, both the slide 17 and foot plunger 19 are shown as connected at their lower ends to a lever 20 which is pivotally mounted upon a suitable support at 21. Under normal conditions the operating rod is pulled rearwardly until the spring latch 16 engages the notch 15 thereof, thereby locking the headlights 8 in a vertical position so that the light therefrom will be directed straight ahead. However, when it becomes necessary to pass an approaching vehicle, the foot plunger 19 is depressed, thereby pulling downwardly upon the slide 17 and disengaging the latch 16 from the notch 15. The coil springs 9 will then rotate the rock shaft 6 and tilt the headlights 8 forwardly so that the light will be directed downwardly upon the road at an angle, thereby preventing the driver of the approaching vehicle from being blinded by the glare of the lights. After the vehicle has been passed, the motorist has merely to grasp the finger piece 14 and pull rearwardly upon the operating rod 11 to return the headlights to their vertical position. The maximum efficiency can thus be obtained from the headlights where there are no other vehicles upon the road, although they are mounted in such a manner that they can be easily and quickly released and tilted downwardly when it becomes necessary to pass an approaching vehicle, thereby enabling the headlights to be used with absolute safety.

Figs. 4 and 5 illustrate a modified form of the invention. The headlights 8 are, exactly as in the previous instance, rigidly secured to the extremities of a transverse rock shaft 6 which passes through sleeves 4 at the upper ends of standards 1, being journaled within bearing plates 5 fitted in the ends of the sleeves 4. Coil springs 9ª are arranged within the sleeves 4 and surround the rock shaft 6, one end of each of the coil springs engaging the rock shaft, while the other end thereof engages the sleeve, said springs normally tending to rotate the rock shaft to bring the headlights 8 into a vertical position. The crank arm 10 of the rock shaft is connected by a downwardly extending substantially vertical link member 24 to a rearwardly extending substantially horizontal lever 25 which is arranged under the engine hood and is pivotally connected at an intermediate point in its length to some convenient portion of the chassis or frame, as indicated at 26. The rear end of the operating lever 25 is pivotally connected at 27 to a foot plunger 28 which extends upwardly through the floor 29 of the vehicle, passing loosely through a guide sleeve 30. A spring 31 is arranged within one side of the guide sleeve 30 and slidably engages the plunger 28, normally tending to move the same laterally to hold a beveled tooth 32 projecting therefrom in engagement with one of the notches of a rack 33 in the guide sleeve 30. This rack 33 is inclined downwardly so that when the foot plunger 28 is forcibly depressed the beveled tooth 32 will ride over the rack and engage one of the notches at the lower end thereof. By pressing the foot plunger downwardly, it will be obvious that the operating lever 25 will be swung about a pivot 26 and the rock shaft 6 rotated against the action of the springs 9ª to tilt the headlights 8, the position of the parts when the foot plunger is depressed and the headlights tilted, being indicated by dotted lines on Fig. 4. The engagement of the teeth 30 with one of the lower notches of the rack 33 will lock the parts in this position and hold the headlights tilted until the approaching vehicle has been safely passed. The motorist can then press forwardly upon the foot plunger 28 to disengage the tooth 32 from the rack 33, at the same time permitting the plunger to rise under the action of the coil springs 9ª, thereby again bringing the headlights into a vertical position so that the light therefrom will be projected straight ahead. This construction enables the headlights to be quickly tilted or brought into a vertical position, as may be desired.

Having thus described the invention, what I claim as new and desire to secure by Letters Patent, is:—

1. A tilting headlight construction including a horizontal rock shaft, headlights applied to the ends of the rock shaft, sleeves receiving the rock shaft and having an interior diameter greater than the diameter of the rock shaft, removable bearing plates fitted in the ends of the sleeves and supporting the rock shaft, coil springs surrounding the rock shaft and housed within the sleeves between the removable bearing plates, said springs engaging the rock shaft and normally tending to tilt the headlights in one direction, and means for rotating the rock shaft to swing the headlights against the action of the springs.

2. A tilting headlight construction, including a horizontal rock shaft, bearings for the rock shaft, headlights secured to the ends of the rock shaft, a spring normally tending to rock the shaft to swing the headlights in one direction, an operating rod operatively connected to the rock shaft for moving the same against the action of the spring to swing the headlights in the other direction, a finger piece at the end of the rod, latch means arranged for engagement with the rod to lock the headlights in position with the spring under tension, and a foot plunger operatively connected to the latch means for disengaging the same from the rod to release the headlights.

3. A tilting headlight construction, including a horizontal rock shaft, bearings for the rock shaft, headlights secured to the ends of the rock shaft, a spring normally tending to rock the shaft to swing the headlights in one direction, a rod operatively connected to the rock shaft for rotating the same to swing the headlights in the opposite direction against the action of the spring, latch means engaging the rod to lock the headlights in position with the spring under tension, a slide operatively connected to the latch means, and a foot plunger operatively connected to the slide for releasing the latch means.

4. A tilting headlight construction, including a pair of standards, means at the lower ends of the standards for engaging the main frame of a vehicle, horizontal sleeves at the upper ends of the standards, a horizontal rock shaft extending through the sleeves, springs housed within the sleeves and engaging the rock shaft, said springs normally tending to rock the shaft to swing the headlights in one direction, a rod operatively connected to the rock shaft for rotating the same against the action of the springs to swing the headlights in the other direction, latch means arranged for engagement with the rod to lock the headlights in position with the springs under tension, and a foot plunger operatively connected to the latch means for disengaging the same from the rod and releasing the headlights.

In testimony whereof I have signed my name to this specification in the presence of two subscribing witnesses.

FREDRICH EMIL MEYER.

Witnesses:
O. F. BARNES,
GEO. CHAPPLE.